United States Patent [19]
Dooley

[11] Patent Number: 5,893,916
[45] Date of Patent: Apr. 13, 1999

[54] METHOD OF CONVERTING MAN PAGES TO HELP TOPIC FILES

[75] Inventor: Marilyn R. Dooley, Lexington, S.C.

[73] Assignee: NCR Corporation, Dayton, Ohio

[21] Appl. No.: 08/764,376

[22] Filed: Dec. 13, 1996

[51] Int. Cl.$^6$ .................................................. G06F 17/00
[52] U.S. Cl. ............................................................ 707/523
[58] Field of Search ................................. 707/523, 524, 707/537

[56] References Cited

U.S. PATENT DOCUMENTS

| | | | |
|---|---|---|---|
| 4,751,740 | 6/1988 | Wright | 382/180 |
| 5,537,628 | 7/1996 | Luebbert | 707/522 |
| 5,652,876 | 7/1997 | Ashe et al. | 395/500 |
| 5,708,828 | 1/1998 | Coleman | 707/523 |

Primary Examiner—Mark R. Powell
Assistant Examiner—Alford W. Kindred
Attorney, Agent, or Firm—Gates & Cooper

[57] ABSTRACT

A method, apparatus, and program storage device convert text-based UNIX man pages to formatted Windows help topic files of the type including non-textual formatting information. Porting of applications to other operating systems is facilitated due to the decreased effort required to port the applications' associated on-line help documents. Moreover, the resulting help topic files may then be used to compile on-line help for multiple platforms which utilize such help topic files, e.g., Windows NT, Windows 95, Windows 3.1x, and even GUI UNIX variations such as X-Windows and Motif.

24 Claims, 8 Drawing Sheets

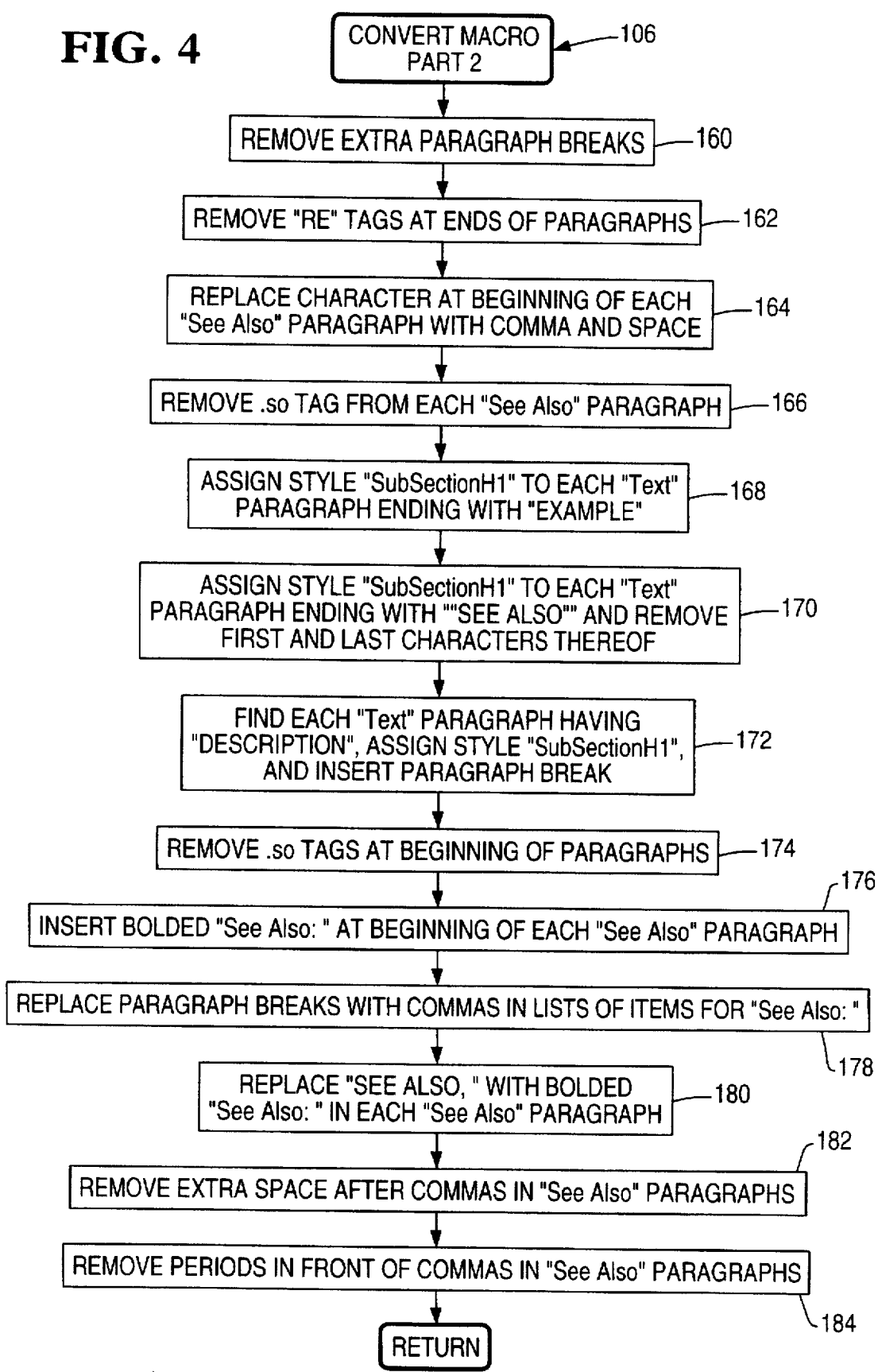

```
.\"     @ ( # ) smc_man : smcdiff.1    1.6     93/07/06
.\"     COPYRIGHT ( C ) 1991 BY NCR CORPORATION - - DAYTON, OHIO
.\"     ALL RIGHTS RESERVED.
.If t .pl 10i
.TH smcdiff  1T " (7/6/93) "  " NCR CORPORATION "  " TOP END / MESSAGE CATALOG "
.SH NAME
\fBsmcdiff\fp - COMPARE TWO SOURCE MESSAGE CATALOGS
.SH SYNOPSIS
.B smcdiff
smcfile1 smcfile2
.SH DESCRIPTION
.B smcdiff
COMPARE THE MESSAGES IN TWO DIFFERENT SOURCE MESSAGE CATALOGS (SMC).
EACH MESSAGE IS COMPARED INDIVIDUALLY AND A LINE IS PRINTED IF THE
MESSAGE HAS CHANGED. NO LINE IS PRINTED FOR UNCHANGED MESSAGES.
.PP
.B smcdiff
CAN BE USED TO DETERMINE WHETHER AN SMC HAS CHANGED.
WHEN AN SMC IS BEING LOCALIZED FOR A SPECIFIC LANGUAGE, THE BASE SMC
FROM WHICH THE TRANSLATION IS MADE WILL BE SAVED. WHEN A NEWER
VERSION OF THE BASE SMC IS AVAILABLE, \fBsmcdiff\fR CAN BE USED TO
DETERMINE WHICH MESSAGES NEED TO BE MODIFIED IN THE LOCALIZED SMC.
.ne 4
.br
.SH DIAGNOSTICS
.PP
THE FOLLOWING DIAGNOSTIC MESSAGES MAY BE PRINTED. IN EACH CASE, THE
MESSAGE NUMBER LISTED IS THE NUMBER OF THE MESSAGE THAT HAS CHANGED.
.TP
01234: ADDED TO \fIsmcfile2\fR
THE MESSAGE HAS BEEN ADDED.
.TP
01234: REMOVED FROM \fIsmcfile2\fR
THE MESSAGE HAS BEEN REMOVED.
.TP
01234: CHANGED VALUE
THE VALUE OF ONE OR MORE KEYWORDS HAS CHANGED.
.PP
.B smcdiff
RETURNS ONE OF THREE DIFFERENT EXIT STATUSES:
\fB0\fR FOR A NORMAL EXIT,
\fB1\fR FOR AN EXTERNAL ERROR, SUCH AS FILE NOT FOUND,
\fB2\fR FOR A USAGE ERROR.
.SH SEE ALSO
smc2cat(1T),
smc2hdr(1T),
smc2mkmsgs(1T),
smccheck(1T),
tp_pub_build(1T),
smc(4T),
.br
TOP END LOCALIZATION GUIDE.
.br
.\"  .SH NOTES
```

S + K smcdiff 1T

SEE ALSO: smc2cat(1T), smc2hdr(1T), smc2mkmsgs(1T), smccheck(1T), tp_pub_build(1T), smc(4T), TOP END LOCALIZATION GUIDE

NAME smcdiff – COMPARE TWO SOURCE MESSAGE CATALOGS

SYNOPSIS smcdiff smcfile1 smcfile2

DESCRIPTION smcdiff COMPARES THE MESSAGE IN TWO DIFFERENT SOURCE MESSAGE CATALOGS (SMC). EACH MESSAGE IS COMPARED INDIVIDUALLY AND A LINE IS PRINTED IF THE MESSAGE HAS CHANGED. NO LINE IS PRINTED FOR UNCHANGED MESSAGES. smcdiff CAN BE USED TO DETERMINE WHETHER AN SMC HAS CHANGED. WHEN AN SMC IS BEING LOCALIZED FOR A SPECIFIC LANGUAGE, THE BASE SMC FROM WHICH THE TRANSLATION IS MADE WILL BE SAVED. WHEN A NEWER VERSION OF THE BASE SMC IS AVAILABLE, smcdiff CAN BE USED TO DETERMINE WHICH MESSAGES NEED TO BE MODIFIED IN THE LOCALIZED SMC.

DESCRIPTION

THE FOLLOWING DIAGNOSTIC MESSAGES MAY BE PRINTED. IN EACH CASE, THE MESSAGE NUMBER LISTED IS THE NUMBER OF THE MESSAGE THAT HAS CHANGED.

01234: ADDED TO smcfile2
    THE MESSAGE HAS BEEN ADDED.
01234: REMOVED FROM smcfile2
    THE MESSAGE HAS BEEN REMOVED.
01234: CHANGED VALUE
    THE VALUE OF ONE OR MORE KEYWORDS HAS CHANGED. smcdiff RETURNS ONE OF THREE DIFFERENT EXIT STATUSES: 0 FOR A NORMAL EXIT, 1 FOR AN EXTERNAL ERROR, SUCH AS FILED NOT FOUND, 2 FOR A USAGE ERROR.

--- smcdiff
$smcdiff 1T
+smc:0060
Ksmcdiff 1T

METHOD OF CONVERTING MAN PAGES TO HELP TOPIC FILES

BACKGROUND OF THE INVENTION

1. Field of the Invention

The present invention relates generally to document conversion, and in particular, to computer-implemented tools for porting documents between computer platforms.

2. Description of the Related Art

Cross-platform compatibility continues to be increasingly important for the success of a computer software application. A number of computer platforms such as variations of UNIX, Windows NT, Macintosh, Windows 95, Windows 3.1x, DOS, OS/2, etc. each command a substantial market share of the computer software industry.

The ability of a software maker to "port" a computer software application to other platforms expands the possible user base for the application and consequently can often increase sales of the application. However, porting applications between incompatible platforms can be costly and time-consuming, and thus, a substantial need continues to exist for tools which automate some of the steps required to port an application to another platform.

A particular need has arisen for porting UNIX applications to alternative platforms such as Windows NT. In porting applications between UNIX and Windows NT, however, a number of difficulties arise, not the least of which involves developing new Windows NT-compatible on-line help documents for the ported UNIX application.

In character-based versions of UNIX, the on-line help system relies on coded ASCII format help documents known as man pages. Formatting codes for the man pages are in the form of text codes embedded in the help text.

In contrast, the Windows on-line help system used in graphical user interfaced (GUI) platforms such as Windows NT as well as Windows 3.1x and Windows 95 utilizes help files that are compiled from Rich Text Format (RTF) help topic files, where links between help topics and other codes are designated using specific non-textual formatting information (e.g., topic identifiers, or context strings, are formatted as hidden text, and pop-up buttons are formatted as underlined text). Other information (e.g., keywords, browse sequences, etc.) may be stored in footnotes.

The significant differences between UNIX man pages and Windows help topic files makes it difficult and time-consuming to port man pages into a format suitable for use in Windows. Typically, hardcopies of the man pages may need to be scanned in, converted to text using optical character recognition (OCR), and then manually reformatted to include suitable formatting codes for a help topic file.

Therefore, a significant need has continued to exist for a manner of automating the conversion of text-based UNIX man pages to formatted Windows help topic files.

SUMMARY OF THE INVENTION

To address the requirements described above, the present invention discloses a method, apparatus, and program storage device for converting text-based man pages to formatted help topic files of the type including non-textual formatting codes. By automating this process, porting of applications is facilitated due to the decreased effort required to port the applications' associated on-line help documents. Moreover, the resulting help topic files may then be used to compile on-line help for multiple platforms which utilize compiled help files, e.g., Windows NT, Windows 95, Windows 3.1x, and even GUI UNIX variations such as X-Windows and Motif.

BRIEF DESCRIPTION OF THE DRAWINGS

Referring now to the Drawings in which like reference numbers represent corresponding parts throughout:

FIG. 4 is a flowchart illustrating the program flow of a second Generate Help Topic macro of FIG. 2;

FIG. 6 is an example text-based man page; and

FIG. 7 is an example help topic generated from the man page of FIG. 6.

DETAILED DESCRIPTION OF THE PREFERRED EMBODIMENT

In the following description, reference is made to the accompanying drawings which form a part hereof, and which is shown by way of illustration embodiments of the invention. It is understood that other embodiments may be utilized and structural changes may be made without departing from the scope of the present invention.

Hardware Environment

Figure 1:
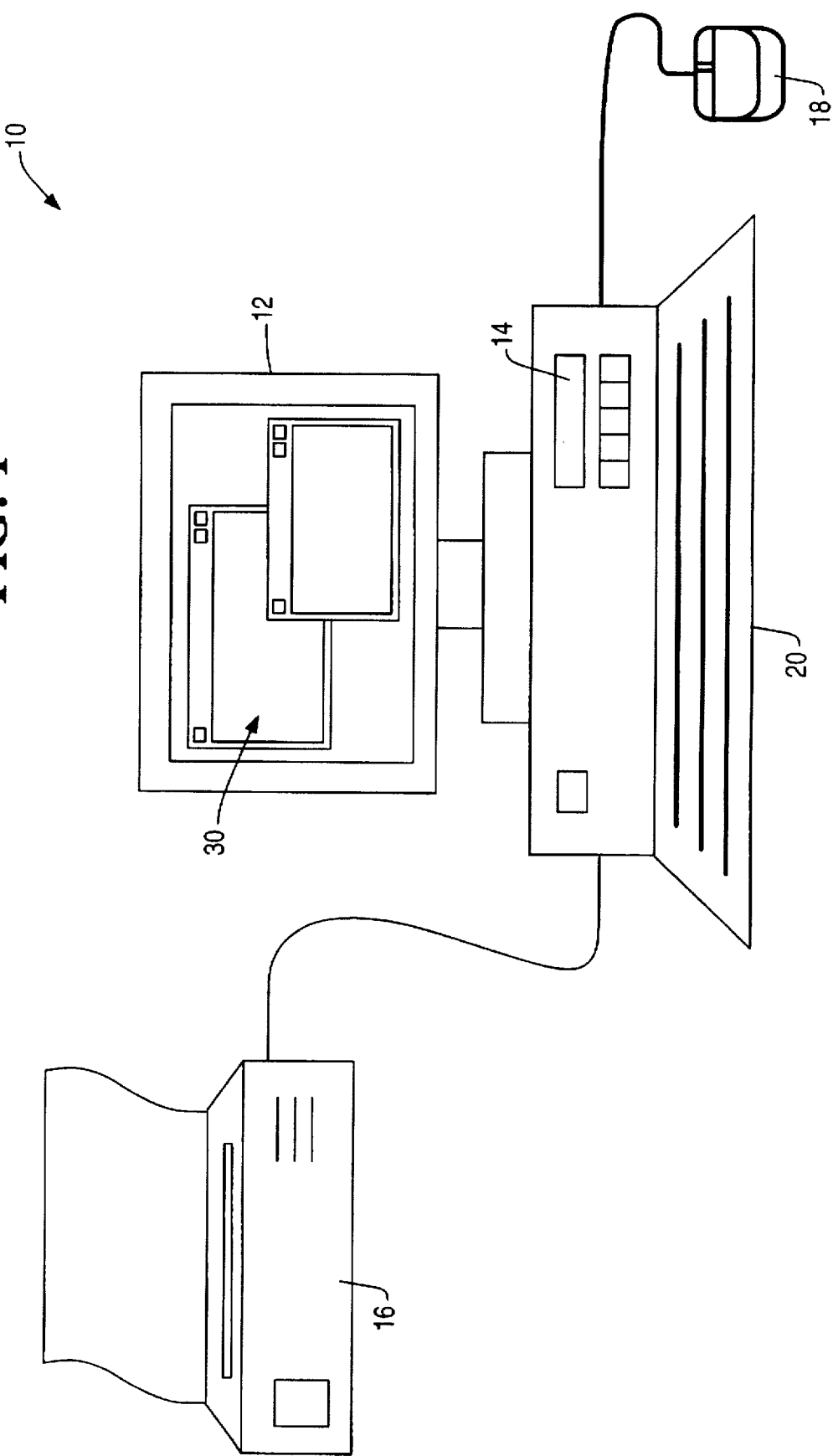
FIG. 1 is a block diagram illustrating an exemplary hardware environment used to implement the preferred embodiment of the invention.

FIG. 1 is an exemplary hardware environment used to implement the preferred embodiment of the invention. The present invention is typically implemented using a personal computer 10. It is envisioned that attached to the personal computer 10 may be a monitor 12 (e.g., a CRT, an LCD display or other display device); hard, floppy, and/or CD-ROM disk drives 14; and printer 16 peripherals. Also included in the preferred embodiment may be input devices, for example, a mouse pointing device 18 and a keyboard 20.

Generally, the computer programs which implement the preferred embodiment of the invention are tangibly embodied in a computer-readable medium, e.g., one or more fixed and/or removable data storage data devices coupled to computer 10. Under control of computer 10, the computer programs may be loaded from the data storage devices 14 into the memory of the computer 10. The computer programs comprise instructions which, when read and executed by computer 10, cause computer 10 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Implementation

The preferred application of the present invention is in automating the conversion of UNIX man pages to Windows-compatible help topic files that are used with the help application resident in the Microsoft Windows NT, Windows 95 and Windows 3.1x operating systems.

UNIX man pages are typically stored alone or in groups in text files which provide information regarding particular UNIX commands or functions, e.g., name, syntax, use, parameters, return values, related commands and/or functions, etc. The files are typically provided in NROFF text format which includes only basic formatting information in the form of text tags, e.g., dot and backslash codes which are preceded respectively by "." and "\" characters. Given the many variations and permutations of UNIX, however, there are widely varying formats of man pages that are based upon this basic file structure. In the preferred embodiment, the man pages are used with the TOP END (Release 2.03) software product available from NCR. It should be appreciated that other embodiments may be optimized for use with other man page formats, and accordingly, the invention should not be limited to the particular man page format disclosed herein.

Help topic files are typically groups of one or more help topics delimited by page breaks and stored as Rich Text Format (RTF) files and thereafter compiled by a help compiler application to form help (HLP) files. The generation of help files in Microsoft Windows is well known in the art, and is shown, for example, in the publication *Help Compiler Guide* (1993) available from Microsoft Corporation, which is incorporated herein by reference.

Briefly, an .RTF help topic file is a computer readable document that includes both textual, or human readable, information, and formatting information in the form of non-text formatting codes which are readable by the help compiler. The use of formatting information to provide commands, or control codes, to the help compiler simplifies generation of the help topic file since an operator is capable of recognizing the commands merely by analyzing the formatting of the text in the file.

The present invention generally operates by converting a UNIX man page, including text tags, to a formatted help topic file including corresponding formatting codes that are readable by the Windows help compiler. The help topic file (in Rich Text Format or RTF) may also be readable by another compiler such as Bristol Technology's HyperHelp compiler for UNIX which also accepts a similar format.

The preferred embodiment of the invention is implemented in one or more Word Basic macros which execute in a specifically developed Microsoft Word for Windows template file (e.g., as executed in application 30 illustrated in FIG. 1). It should be appreciated that programming in Word Basic is well known in the art, and thus the implementation of the preferred embodiment in such an environment would be well within the skill of the ordinary artisan. It should also be appreciated that any number of alternative application and computer platforms and programming languages may instead be used to implement the invention. Thus, the invention should not be limited to the particular macro-based implementation disclosed herein.

Figure 2:
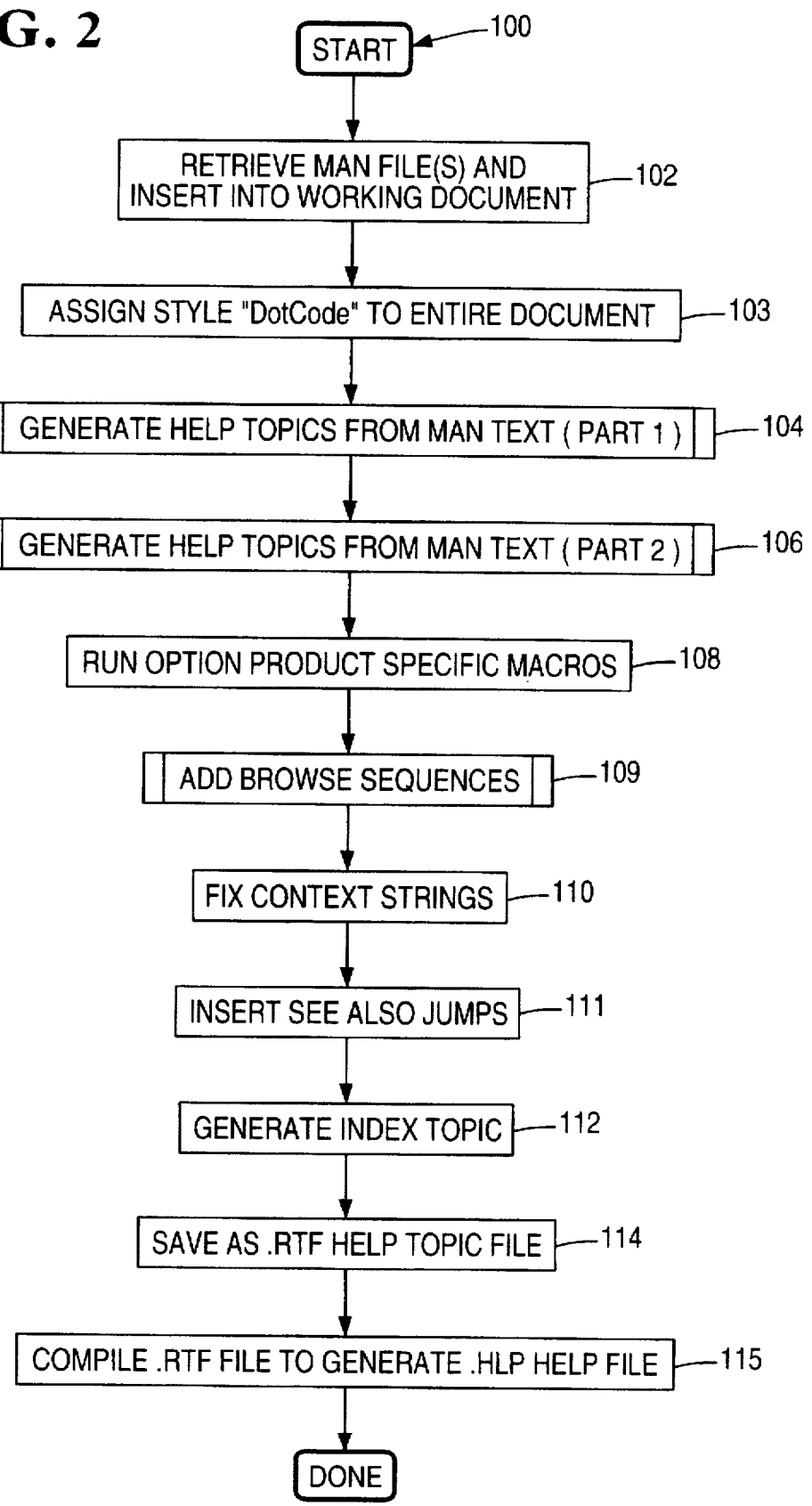
FIG. 2 is a flowchart illustrating an overall program flow of the preferred embodiment of the invention.

FIG. 2 illustrates the flow of a preferred man page conversion process 100 consistent with the principles of the invention. With process 100, one or more UNIX man files (each of which may include one or more man pages) are inserted as text into a working document. Block 102 is preferably performed using a separate macro which is executed on a separate document that contains a list of man file filenames. Each filename is used to retrieve its corresponding man file and append the text to the working document. Alternatively, a macro may be used which prompts a user to select man files for conversion, with any number of user interface options utilized to facilitate the operator's selection of man files. Moreover, the files may be inserted manually by an operator without the use of a separate macro.

Next, in block 103, a "DotCode" style is initially assigned to the entire working document. Then, in blocks 104 and 106, a pair of help topic generating macros are executed to generate help topics from the textual information (including the man-compatible text tags) in the working document. Blocks 104 and 106 primarily operate by searching the coded text in the working document for specific tags and, based upon the tags, creating a help topic for each man page, applying font and paragraph formatting to the text, and generating footnotes for each help topic (man page).

Figure 3A:
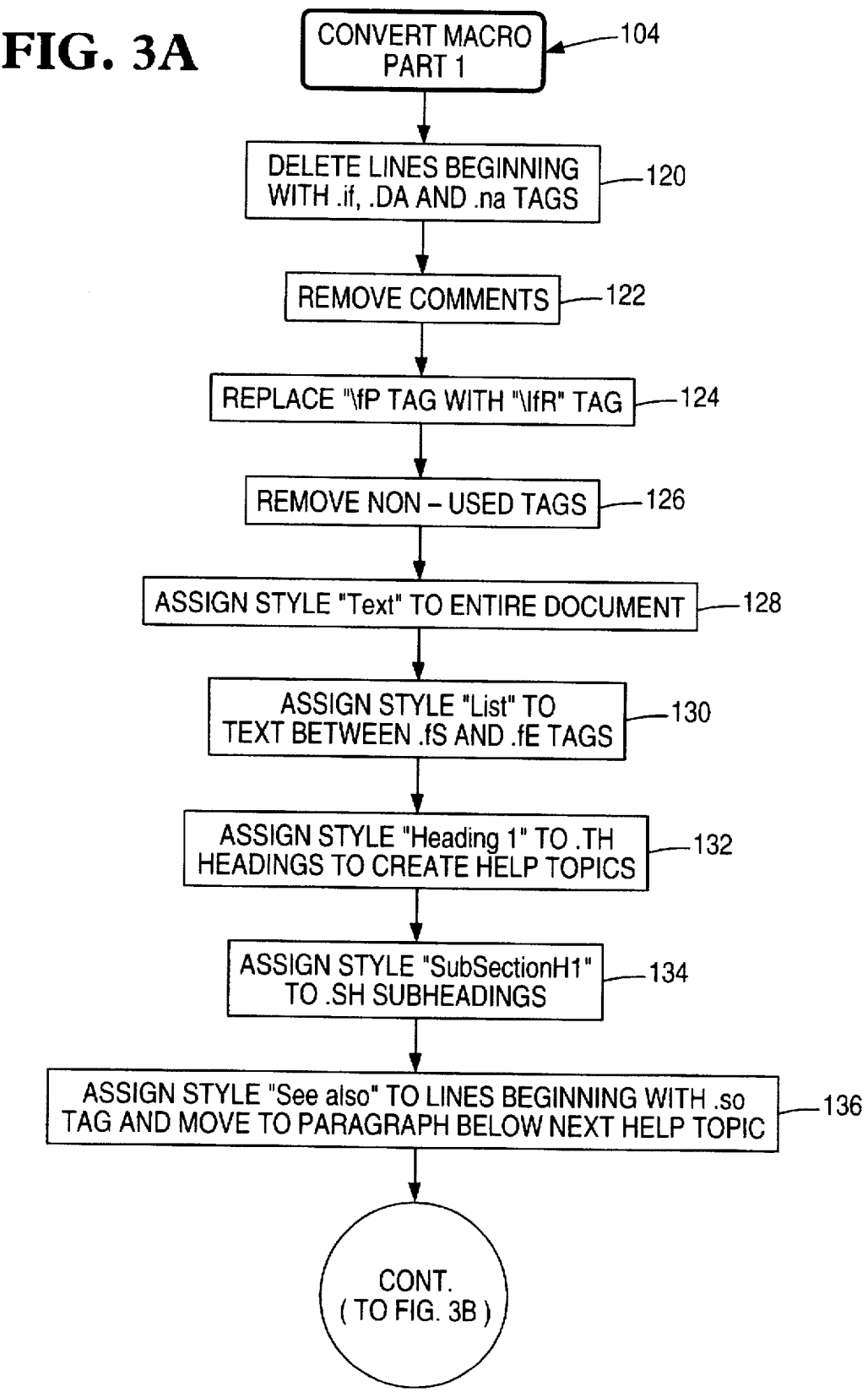
FIGS. 3(a) and 3(b) are flowcharts illustrating the program flow of a first Generate Help Topic macro of FIG. 2.
Figure 3B:
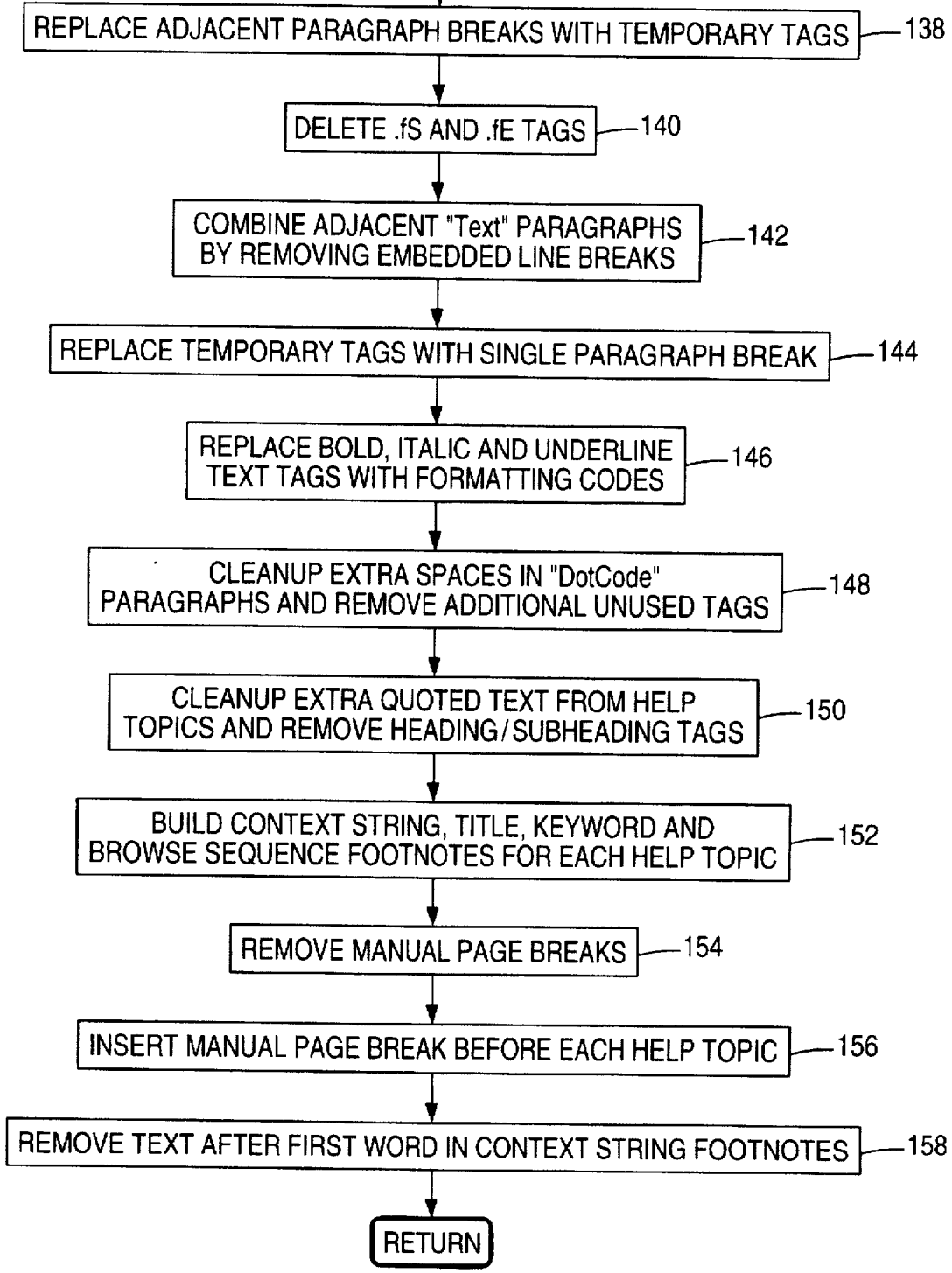

The preferred steps performed in the first help topic generating macro 104 are illustrated as blocks 120–158 in FIGS. 3(a) and 3(b). First, in block 120, any lines beginning with ".if", ".DA" and ".na" tags are deleted, as these tags represent information that is not required in a help topic file. Next, in block 122, man comments (i.e., text starting with the tag ".\") are deleted. Next, in block 124, all occurrences of "\fP" (turns off formatting such as bold) tags are replaced with "\fR" tags. Next, in block 126, several non-used tags, including ".sp", ".br", ".LP", ".eT", "PM", ".PP", ".ST", ".LI", ".BL", ".RS", ".nf", ".ft", ".IP ", ".SS", ".fG", ".sT", ".TP", and ".RE", are deleted and replaced with single paragraph breaks.

Next, in block 128, a "Text" style is applied to the entire working document, and in block 130, any text between ".fS" and ".fE" (start and end) tags is assigned with a "List" style. Next, in blocks 132 and 134, "Heading 1" and "SubSectionH1" styles are respectively applied to paragraphs which include ".TH" (heading) and ".SH" (subheading) tags. Next, in block 136, a "See also" style is applied to lines beginning with the ".so" tag which links to .so files. In addition, each of the lines is moved to the next paragraph below the next help topic so that the information is kept with the appropriate man page help topic.

Next, as shown in FIG. 3(a), multiple adjacent paragraph breaks are replaced with temporary tags (e.g., "@@@") in block 138, and all ".fS" and ".fE" tags are deleted in the "List" style paragraphs in block 140. Next, in block 142, adjacent "Text" style paragraphs are combined by removing any embedded line breaks therebetween. Next, in block 144, the temporary tags inserted in block 138 are replaced with single paragraph breaks.

Next, in block 146, bold, italic and underline text is formatted by searching for the respective formatting tags in the working document (e.g., "\fI" for italics, "\fB" for bold, and "\f3" for underline), finding the matching closing tags (typically "\f" or "\fR"), applying the appropriate formatting codes to the text therebetween, and finally deleting the tags. Next, in block 148, extra paragraph breaks or spaces in "DotCode" style paragraphs are removed, as are several unused formatting tags ("\–" and "\0") from all paragraphs. Next, in block 150, quoted text (that surrounded by quotes), is removed from all "Heading 1" style paragraphs, and the heading and subheading tags (".TH" and ".SH") are removed.

Next, in block 152 the footnotes for each help topic are built from the "Heading 1" style paragraphs. Each man page includes a man page identifier which uniquely identifies the man page. In the preferred embodiment, the identifier is the name of the UNIX command or function which is the subject of the man page, and is located on the same line as and immediately following a heading tag (".TH"). Thus, in the preferred embodiment, the first line of each "Heading 1" style paragraph is copied to the clipboard. Then, four footnotes are inserted at the beginning of the paragraph: (1) a context string footnote with reference character "#", (2) a title footnote with reference character "$", (3) a browse sequence footnote with reference character "+", and (4) a keyword footnote with reference character "K". In addition, the man page identifier, copied to the clipboard, is pasted into the context string, title and keyword footnotes. The browse sequence footnote is left blank, and at a later date, suitable browse sequence values may be input manually by an operator, or automatically through a separate macro configured to perform this particular function.

Next, in blocks 154 and 156, all of the manual page breaks are removed from the working document, and then manual page breaks are inserted at the beginning of each "Heading 1" style paragraph to thereby separate each help topic. In addition, in block 158, all of the text after the first word in each context string footnote is deleted. This results in a context string for each help topic that is essentially the name of the command or function which is the subject of the help topic.

The preferred steps performed in the second help topic generating macro 106 are illustrated as blocks 160–184 in FIG. 4. First, in block 160, extra paragraph breaks are removed, then in block 162, any "RE" tags (which denote the end of one level of relative indenting) are removed from the ends of paragraphs (i.e., those immediately preceding paragraph breaks). Next, in block 164 the character at the beginning of each "See also" style paragraph is removed and replaced with a comma and space for consistency purposes. Next, in block 166 all ".so" (see also) tags are removed from each "See also" style paragraph.

Next, in block 168, each "Text" style paragraph that ends with the text "EXAMPLE" is assigned with the "SubSectionH1" style. Also, in block 170, each "Text" style paragraph that ends with the text "SEE ALSO" in double quotes is assigned with the "SubSectionH1" style, and the first and last characters of the paragraph (the quotes surrounding "SEE ALSO") are deleted. Moreover, in block 172, each "Text" style paragraph is searched for the term "DESCRIPTION", whereby a paragraph is inserted after the term and the paragraph now containing the term is assigned the "SubSectionH1" style.

Next, in block 174, the remaining ".so" (see also) tags are removed from the beginnings of paragraphs and the paragraphs having these tags are joined to their preceding paragraphs by also removing the paragraph breaks therebetween. Next, in block 176, a bolded expression "See also:" is inserted at the beginning of each "See also" style paragraph, and in block 178, the paragraph breaks between list items in each list of terms after "See also:" are replaced with commas. Then, in block 180, the term "SEE ALSO," is replaced with the bolded expression "See also:" in each "See also" style paragraph. Next, in blocks 182 and 184, extra spaces after commas and periods in front of commas are removed from each "See also" style paragraph.

Returning to FIG. 2, after help topics have been built from the man files, one or more specialized macros are optionally executed to handle product-specific situations. In particular, a number of man page variations exist, each of which may require one or more specialized macros to handle unique formatting.

For example, one such macro is a Add Parenthesis macro which is used to add parenthesis around "group" designations that may follow each man page function name. For example, for the aforementioned TOP END product, each man page function is grouped into one of five groups (1T, 2T, 3T, 4T and 5T). The Add Parenthesis macro basically searches each footnote and "Heading 1" style paragraph for one of the groups, and inserts parenthesis around any found group designations.

Another such macro is a Table Conversion macro which converts a man page table into a Microsoft Word table. Basically, the macro operates by operating on text between a pair of man tags ".TS" and ".TE" (table start and table end), and replaces semicolons between table cells with tab delimiters. In addition, unused tags "T{", "T}", "}T" and ".50" are removed. Finally, the now tab-delimited table cells are converted to a Word table using the TextToTable command provided with Word.

Another optional macro which may be executed is an Extract Name Description macro which, for each man page, pulls the name of the man page function and its accompanying short description and copies the same to a separate file. Such a macro may be useful to generate a summary of the man pages in a particular working document.

An additional optional macro which may be executed is a Clean Up See Alsos macro which performs additional formatting of "See Also" style paragraphs above and beyond the formatting performed in the help topic generating macros. For example, in the aforementioned TOP END product, group designations may be appended to individual man pages, and it is preferable for consistency to place parenthesis around these group designations in the See Also sections of the help topics. Consequently, several formatting steps may occur as necessary, principally including the addition of parenthesis around group designations, the removal of extraneous spaces, commas and paragraph breaks, as well as the removal of unmatched parenthesis.

Figure 5:
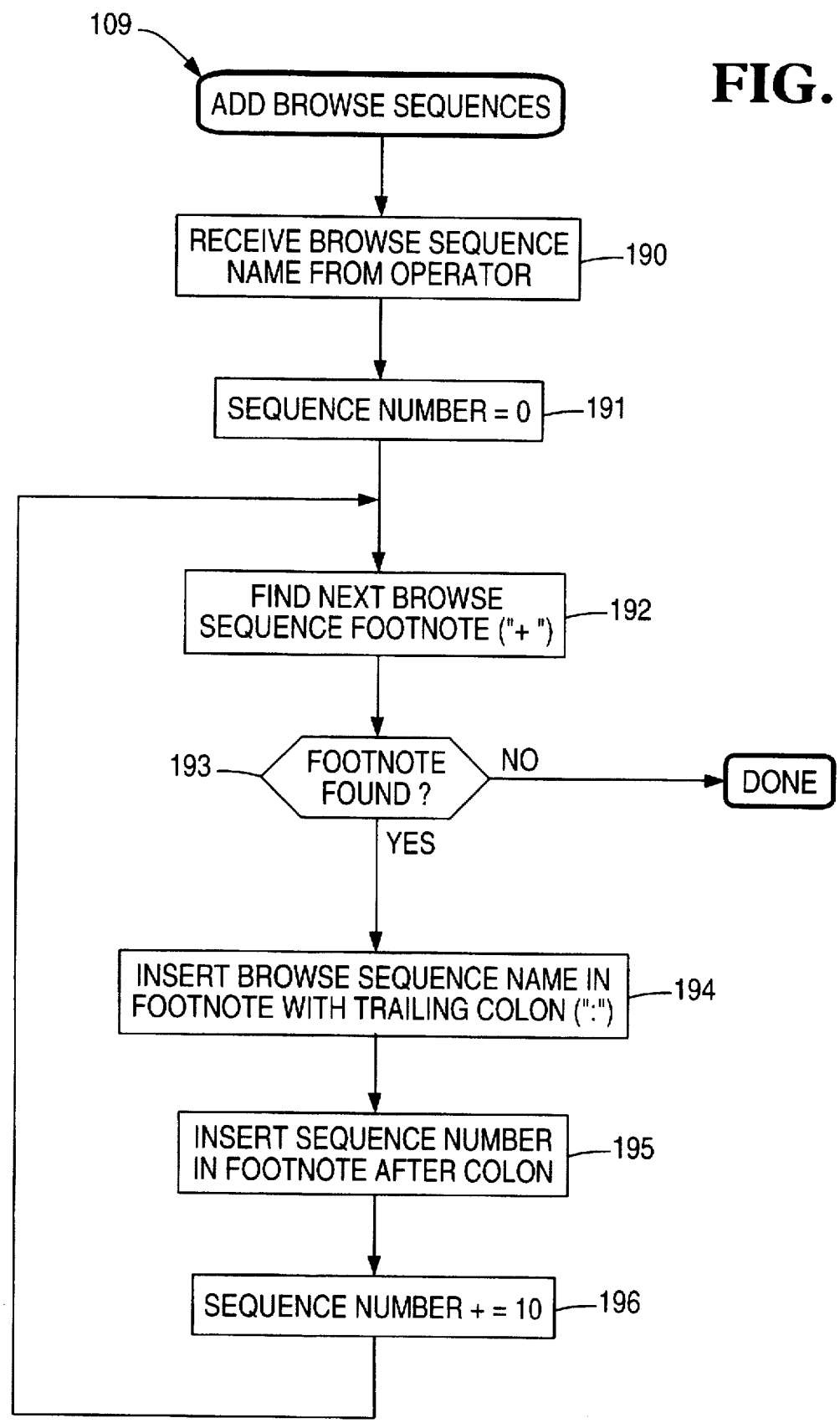
FIG. 5 is a flowchart illustrating the program flow of a Add Browse Sequences macro of FIG. 2.

After execution of one or more of the optional macros, browse sequences are added in block 109 by executing an Add Browse Sequences macro illustrated in FIG. 5. First, in block 190, the operator is prompted to enter a browse sequence name or descriptor that is to be applied to each help topic in the working document. For macro 109, it is assumed that all help topics in a working document are related and ordered in the manner in which they should be browsed, and consequently, macro 109 sequentially orders the browse sequences of each help topic in the working document. In the alternative, multiple browse sequences may be generated from a single working document, e.g., by designating only a portion of the help topics in a document for each browse sequence name. In addition, browse sequences may also be entered manually if greater customization is required.

After a browse sequence name is received, block 191 resets a counter SequenceNumber to zero, then block 192 searches from the start of the document for the next browse sequence footnote, typically by searching for the footnote reference followed by space ("+"). If a footnote is found, the browse sequence name and a colon (":") are inserted after the footnote reference in block 194, and the current SequenceNumber is inserted after the colon in block 195. The SequenceNumber is incremented by ten in block 196 and control returns to block 192 to find the next footnote. Execution continues until block 193 determines no footnotes remain, whereby execution of the macro terminates. It may be desirable to utilize each browse sequence as a four digit number starting with "0000". Consequently, three digit variables, representative of the tens, hundreds, and thousandths digits may be maintained and inserted along with a trailing "0" to generate four digit sequential browse sequence numbers in the format "0000", "0010", "0020", etc.

Returning to FIG. 2, after insertion of browse sequences into the working document, a Fix Context Strings macro is executed in block 110. This macro essentially searches each context string footnote (which starts with "#"), then replaces each space following "#" with an underscore ("_"), as spaces are not permitted in context strings.

Next, after correction of context string footnotes, hyperlink jumps are preferably inserted into the See Also references of each help topic using a macro that is executed in block 111. Each hyperlink jump includes the text to display, which should be in double underline or strike-through format, followed by the context string of the help topic to jump to in hidden text. In the preferred embodiment, the function name listed in the See Also references should be displayed as the link, and the context string to jump to should be the same as the function name. Accordingly, a macro is executed to find each link in the "See Also" style paragraphs (which are delimited by commas), set the link to double outline style (to indicate a jump), and paste a copy of the link immediately following the link in hidden text format (as the context string). In addition, after all of the jumps have been created, additional formatting may be performed, e.g., removing other extraneous spaces, commas, and unmatched parenthesis as required.

Moreover, periods (".") within hidden text formatting should be replaced with underscores ("_") to properly format the context strings defined therein.

Next, block 112 executes a Generate Index macro which automatically creates and appends an index topic to the working document which includes hypertext jumps to each man page (each of which is now a help topic). Such a macro essentially retrieves from each help topic (1) the title (e.g., from its "Heading 1" paragraph or from its Title footnote), and (2) the context string (e.g., from its Context String footnote). Then, in a separate document, an index entry including the title and a hyperlink jump which incorporates the context string is created for each help topic. Creation of the hyperlink jump may be performed similar to the manner in which jumps for the See Also references are created as discussed above. In addition, sorting of the index entries may be performed, e.g., to alphabetize the entries.

Upon completion of the macros in blocks 102–112, block 114 is executed to store the working document as a help topic file in a Rich Text Format (.RTF) file suitable for use with the Windows Help Compiler. Next, in block 115, the .RTF file (along with suitable project and other support files) is passed through the Windows Help Compiler to generate the final .HLP file suitable for use with the Windows on-line help system.

As a working example illustrating the operation of the preferred embodiments of the invention, FIGS. 6 and 7 respectively show a text-based man page and the resulting help topic generated therefrom by conversion process 100.

It should be appreciated that numerous variations may be made to the preferred embodiments of the invention. For example, the working document may be saved at different points along the conversion process. In addition, other help topic formatting steps, e.g., building pop-up windows, adding browse sequences, linking help topics, etc. may also be performed manually or through the use of additional macro functions. Moreover, other document formats may be used depending upon the editing application, as well as the type of help topic file required by a help compiler. Other modifications will be apparent to one skilled in the art.

Conclusion

This concludes the description of the preferred embodiment of the invention. The following describes some alternative embodiments for accomplishing the present invention.

For example, any type of computer or combinations of computers, such as mainframes, minicomputers, work stations or personal computers, could be used with the present invention. Moreover, the various programs and macros may be implemented in different programming languages, any may be combined into the same computer program if desired. Moreover, different file formats may be used for the various files generated throughout the preferred process.

As another alternative, unmapped man tags in the working document may be mapped to suitable formatting codes (e.g., paragraph styles) prior to compilation, either manually or using a dedicated macro. A map macro suitable for this function searches the working document for text tags, displays a list of the tags used in the man pages and how they map to the styles used in the template, and prompts the user to map unmapped codes to a paragraph style.

Several advantages are realized as a result of the invention. Specifically, preferred embodiments of the invention permit existing UNIX man files to be re-used, often producing source files that may be compiled for use on multiple platforms. In addition, the need to scan hardcopies, perform optical character recognition, and manually reformat the scanned-in text is reduced or eliminated. Also, the conversion process is highly automated, and thus reduces the amount of time and resources necessary to optimize the existing man pages for use on multiple platforms. In summary, the present invention discloses a method, apparatus, and program storage device for translating textual information in a computer readable document.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method of converting a UNIX man file, of the type including at least one text man page having formatting information in the form of text tags, into a help topic file, of the type including at least one formatted help topic having formatting information in the form of non-text formatting codes, the method comprising the steps of:
   (a) receiving with a computer a man file having at least one man page;
   (b) generating with the computer a help topic from the man page, including the steps of:
      (1) retrieving a man page identifier from the man file; and
      (2) building a help topic footnote using the man page identifier; and
   (c) storing the help topic with the help topic footnote in a help topic file.

2. The method of claim 1, wherein the receiving step provides a working document including the man page, wherein the generating step operates on the working document, wherein the storing step comprises storing the working document as the help topic file, and wherein the generating step further comprises the steps of:
   converting font text tags in the working document into corresponding formatting codes; and
   removing unused text tags from the working document.

3. The method of claim 2, wherein the receiving step receives the man file into a word processing application running on the computer, and wherein the generating step is performed by a macro executing within the word processing application.

4. The method of claim 1, wherein the man page identifier receiving step includes searching the man page for a heading text tag, wherein the man page identifier immediately follows the heading text tag, and wherein the footnote building step includes copying the man page identifier into the footnote.

5. The method of claim 4, wherein the footnote building step includes building a plurality of footnotes selected from the group consisting of context string, title, keyword and browse sequence footnotes, and combinations thereof.

6. The method of claim 5, wherein the footnote building step further includes deleting all but the first word in the man page identifier from the context string footnote such that the context string for the help topic is the first word of the man page identifier.

7. The method of claim 1, further comprising the step of building an index topic and appending the index topic to the help topic file.

8. The method of claim 1, wherein the man file includes a plurality of man pages, the method further comprising the step of inserting page breaks between help topics.

9. An apparatus for converting a UNIX man file, of the type including at least one text man page having formatting information in the form of text tags, into a help topic file, of the type including at least one formatted help topic having formatting information in the form of non-text formatting codes, the apparatus comprising:

(a) a computer;

(b) receiving means, performed by the computer, for receiving a man file having at least one man page;

(c) generating means, performed by the computer, for generating a help topic from the man page, the generating means including:

(1) retrieving means for retrieving a man page identifier from the man file; and (2) building means for building a help topic footnote using the man page identifier; and (d) storing means, performed by the computer, for storing the help topic with the help topic footnote in a help topic file.

10. The apparatus of claim 9, wherein the receiving means provides a working document including the man page, wherein the generating means operates on the working document, wherein the storing means stores the working document as the help topic file, and wherein the generating means further includes:

converting means for converting font text tags in the working document into corresponding formatting codes; and removing means for removing unused text tags from the working document.

11. The apparatus of claim 10, wherein the receiving means receives the man file into a word processing application running on the computer, and wherein the generating means comprises a macro executing within the word processing application.

12. The apparatus of claim 9, wherein the retrieving means searches the man page for a heading text tag, wherein the man page identifier immediately follows the heading text tag, and wherein the footnote building step includes copying the man page identifier into the footnote.

13. The apparatus of claim 12, wherein the building means builds a plurality of footnotes selected from the group consisting of context string, title, keyword and browse sequence footnotes, and combinations thereof.

14. The apparatus of claim 13, wherein the building means deletes all but the first word in the man page identifier from the context string footnote such that the context string for the help topic is the first word of the man page identifier.

15. The apparatus of claim 9, further comprising index topic building means for building an index topic and appending the index topic to the help topic file.

16. The apparatus of claim 15, wherein the man file includes a plurality of man pages, the apparatus further comprising inserting means for inserting page breaks between help topics.

17. A program storage device, readable by a computer, tangibly embodying one or more programs of instructions executable by the computer to perform method steps of converting a UNIX man file, of the type including at least one text man page having formatting information in the form of text tags, into a help topic file, of the type including at least one formatted help topic having formatting information in the form of non-text formatting codes, the method comprising the steps of:

(a) receiving with a computer a man file having at least one man page;

(b) generating with the computer a help topic from the man page, including the steps of:

(1) retrieving a man page identifier from the man file; and (2) building a help topic footnote using the man page identifier; and (c) storing the help topic with the help topic footnote in a help topic file.

18. The program storage device of claim 17, wherein the receiving method step provides a working document including the man page, wherein the generating step operates on the working document, wherein the storing step comprises storing the working document as the help topic file, and wherein the generating step further comprises the method steps of:

converting font text tags in the working document into corresponding formatting codes; and removing unused text tags from the working document.

19. The program storage device of claim 18, wherein the receiving method step receives the man file into a word processing application running on the computer, and wherein the generating method step is performed by a macro executing within the word processing application.

20. The program storage device of claim 17, wherein the man page identifier receiving method step includes the method step of searching the man page for a heading text tag, wherein the man page identifier immediately follows the heading text tag, and wherein the footnote building method step includes copying the man page identifier into the footnote.

21. The program storage device of claim 20, wherein the footnote building method step includes building a plurality of footnotes selected from the group consisting of context string, title, keyword and browse sequence footnotes, and combinations thereof.

22. The program storage device of claim 21, wherein the footnote building method step further includes deleting all but the first word in the man page identifier from the context string footnote such that the context string for the help topic is the first word of the man page identifier.

23. The program storage device of claim 17, further comprising the method step of building an index topic and appending the index topic to the help topic file.

24. The program storage device of claim 17, wherein the man file includes a plurality of man pages, the method steps further comprising the step of inserting page breaks between help topics.

* * * * *